(12) United States Patent
O'Callaghan et al.

(10) Patent No.: US 10,323,295 B2
(45) Date of Patent: Jun. 18, 2019

(54) ENERGY AND WATER RECOVERY FROM PRESSURE OXIDATION FLASH VESSEL STEAM

(71) Applicant: Outotec (Finland) Oy, Espoo (FI)

(72) Inventors: John O'Callaghan, Wendouree (AU); Timo Haakana, Espoo (FI); Risto Pieviläinen, Espoo (FI)

(73) Assignee: Outotec (Finland) Oy, Espoo (FI)

( * ) Notice: Subject to any disclaimer, the term of this patent is extended or adjusted under 35 U.S.C. 154(b) by 373 days.

(21) Appl. No.: 14/653,232

(22) PCT Filed: Dec. 20, 2013

(86) PCT No.: PCT/FI2013/051192
§ 371 (c)(1),
(2) Date: Jun. 17, 2015

(87) PCT Pub. No.: WO2014/096550
PCT Pub. Date: Jun. 26, 2014

(65) Prior Publication Data
US 2016/0186288 A1    Jun. 30, 2016

(30) Foreign Application Priority Data
Dec. 20, 2012 (FI) ..................................... 20126354

(51) Int. Cl.
*B01D 3/00* (2006.01)
*B01D 5/00* (2006.01)
(Continued)

(52) U.S. Cl.
CPC ................ *C22B 3/04* (2013.01); *B01D 3/007* (2013.01); *B01D 3/10* (2013.01); *B01D 5/0027* (2013.01);
(Continued)

(58) Field of Classification Search
CPC .. C22B 3/04; B01D 3/06; B01D 3/007; B01D 5/0027; B01J 3/04; F22D 11/00; Y02P 10/234
See application file for complete search history.

(56) References Cited

U.S. PATENT DOCUMENTS 3,961,908 A   6/1976   Touro
5,489,326 A   2/1996   Thomas et al.
(Continued)

FOREIGN PATENT DOCUMENTS

JP    2013083417 A    *   5/2013
WO    02/092862 A1        11/2002

OTHER PUBLICATIONS

JP 2013083417 A machine translation (Year: 2013).*
JP 2013083417-A human translation (Year: 2013).*
Search report from corresponding International Patent Application No. PCT/FI2013/051192, dated May 9, 2014, 4 pgs.
(Continued)

*Primary Examiner* — Tima M McGuthry-Banks
(74) *Attorney, Agent, or Firm* — Chernoff Vilhauer LLP

(57) ABSTRACT

The invention relates to a method for recovering energy and water from pressure oxidation flash steam where first flash steam directly obtained from a flash vessel is contacted with a first recirculating condensate having a first low condensate temperature to condense at least part of the water vapor in the first dirty flash steam and simultaneously to heat the first recirculating condensate to obtain a first recirculating condensate having a first high condensate temperature and a first vent steam. The invention further relates to a pressure oxidation arrangement adapted for use in the method.

12 Claims, 2 Drawing Sheets

(51) Int. Cl.
*B01J 3/04* (2006.01)
*C02F 1/06* (2006.01)
*C22B 3/04* (2006.01)
*C02F 103/16* (2006.01)
*B01D 3/10* (2006.01)
*C22B 3/02* (2006.01)
*F27D 17/00* (2006.01)

(52) U.S. Cl.
CPC ............... *B01J 3/04* (2013.01); *C02F 1/06* (2013.01); *C22B 3/02* (2013.01); *F27D 17/001* (2013.01); *F27D 17/004* (2013.01); *C02F 2103/16* (2013.01); *C02F 2301/046* (2013.01); *C02F 2301/066* (2013.01); *C02F 2301/08* (2013.01); *C02F 2303/10* (2013.01); *Y02P 70/34* (2015.11); *Y02W 10/30* (2015.05)

(56) References Cited

U.S. PATENT DOCUMENTS

| | | | |
|---|---|---|---|
| 5,536,297 A * | 7/1996 | Marchbank | C22B 3/08 75/736 |
| 2005/0077032 A1* | 4/2005 | Donaldson | B01J 8/20 165/110 |
| 2005/0123460 A1 | 6/2005 | Keramidas et al. | |

OTHER PUBLICATIONS

Extended European Search Report prepared by the European Patent Office for EP 13865273.0; dated Aug. 29, 2016, 6 pages.

\* cited by examiner

ENERGY AND WATER RECOVERY FROM PRESSURE OXIDATION FLASH VESSEL STEAM

CROSS-REFERENCE TO RELATED APPLICATIONS

This is a national stage application filed under 35 USC 371 based on International Application No. PCT/FI2013/051192, filed Dec. 20, 2013 and claims priority under 35 USC 119 of Finnish Patent Application No. 20126354 filed Dec. 20, 2012.

FIELD OF THE INVENTION

The present invention relates to a method of recovering energy and water from a pressure oxidation flash steam, particularly in sulphide pressure oxidation.

BACKGROUND OF THE INVENTION

In extractive metallurgy autoclaves are used for increasing operating temperature. Once leached the discharge of the autoclaves is often reduced in temperature and pressure by allowing the autoclave discharge slurry to flash i.e. convert the heat of the slurry at high temperature into a flash steam. The flash steam can be re-used to maximize energy efficiency. For example U.S. Pat. No. 5,489,326 discloses a pressure oxidation process for the recovery of gold wherein steam flashed from oxidized slurry is used to heat the autoclave feed. However, in operations where preheating of the autoclave feed is not required, for example in leaching sulphide concentrates, the flash steam is conventionally directly cleaned in a cleaning devises and released to atmosphere as low grade atmospheric steam. Energy and water is lost to atmosphere without recovery. Water loss from flash steam is also very significant as this water is not recovered.

BRIEF DESCRIPTION OF THE INVENTION

An object of the present invention is thus to provide a method for recovering energy and/or water from a pressure oxidation flash steam and an apparatus for implementing the method so as to overcome the above problems. The invention further relates to use of a direct contact condenser for recovering energy and/or water from flash steam by the method of the invention and to use of the recovered energy as an energy source. The objects of the invention are achieved by a method and an arrangement which is characterized by what is stated in the independent claims. Preferred embodiments of the invention are disclosed in the dependent claims.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
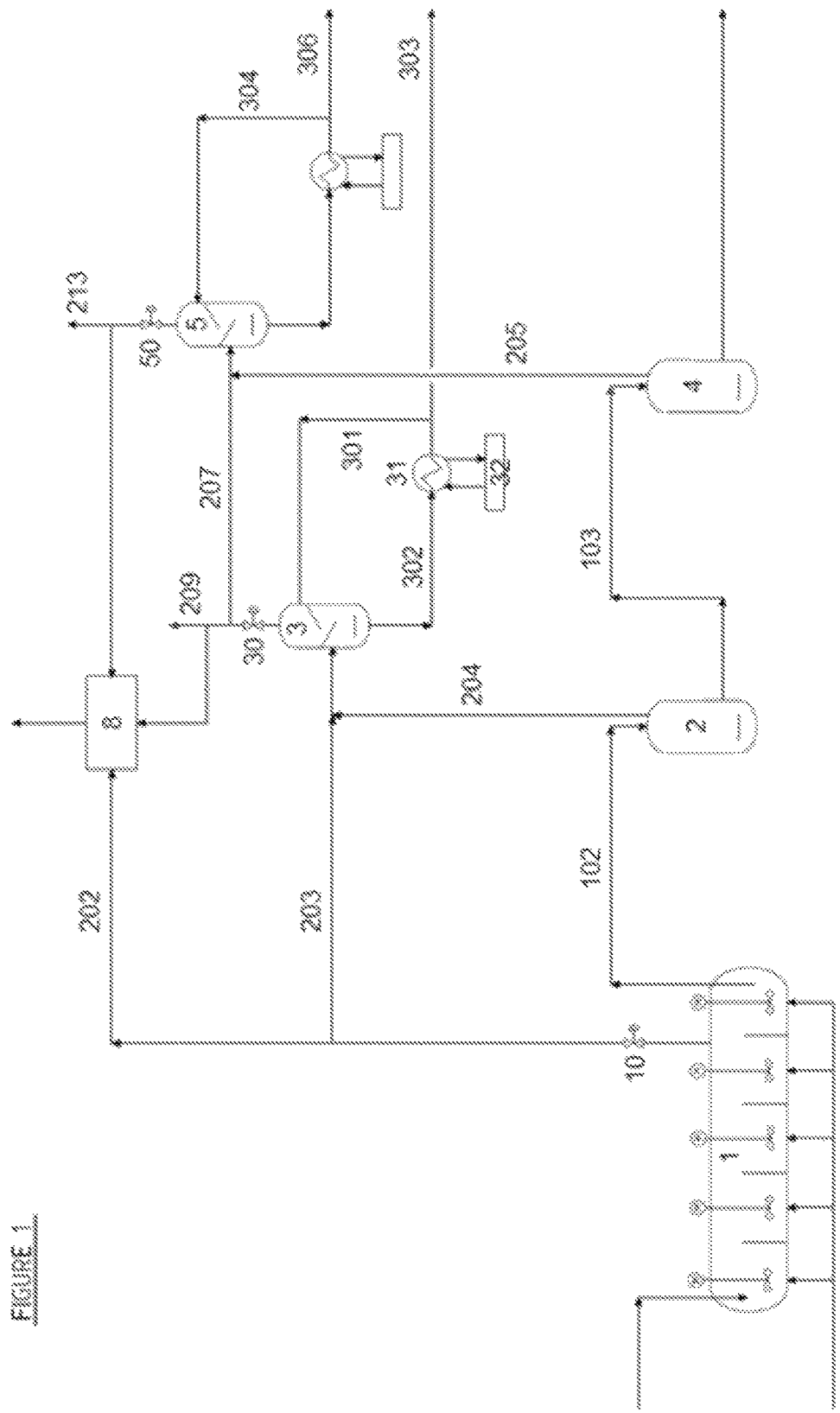
FIG. 1 shows a first arrangement illustrating a first embodiment of the invention.

Depending on the metal ore or concentrate, heat recoverable from the flash steam of a pressure oxidation discharge slurry is either required for preheating the leaching step of the process or redundant and therefore often wasted. In alumina processing and high pressure acid leach (HPAL) nickel industry energy is not generated in the leaching reactions and energy recovery is important. In sulphide pressure oxidation industry, in particular in oxidation of sulphur in gold, copper, nickel and other base metal concentrates, energy from the oxidation of sulphide is potentially available. When leaching sulphide ore or concentrate that comprises low concentration of sulphur, usually mainly as metal sulphide, the autoclave may not reach autogenous operation at the required leaching temperature. In this case energy recovery from flash steam is often practised by pre-heating incoming ore slurry with flash steam.

When leaching sulphide concentrates or ores containing high levels of sulphide, preheating of the feed slurry is not necessary and it may even be necessary to cool the autoclave to operating temperature by direct addition of cool liquid. Subsequently the temperature and pressure of the autoclave discharge slurry is let down in one or more stages of flashing. When energy and/or water recovery is not practiced in these operations, the energy contained in the flash steam is wasted to atmosphere as low grade atmospheric steam, usually after it has been directly cleaned in some sort of cleaning device such as cyclone or venturi scrubber.

In this context low concentrate sulphide ore generally refers to sulphide ore containing less than 5% w/w sulphur of the feed solids. No pre-heating of the leached slurry is generally required when the sulphide concentration of the ore exceeds 7% w/w sulphur of the feed solids. Sulphide concentrate of the invention preferably comprises 5 to 40% w/w sulphur of the feed solids. In this context feed solids refers to sulphide ore or concentrate.

The present invention relates to a method of recovering energy and water from pressure oxidation flash steam comprising a step wherein: (a) a first flash steam directly obtained from a flash vessel is contacted with a first recirculating condensate having a first low condensate temperature to condense at least part of the water vapour comprised in the said first dirty flash steam on the first recirculating condensate and simultaneously to heat the said first recirculating condensate to obtain a first recirculating condensate having a first high condensate temperature and a first vent steam. In accordance with the present invention the first flash steam is preferably obtained by a wherein a pressure oxidation discharge slurry obtained directly from a pressure oxidation autoclave is allowed to flash in the first flash vessel to obtain the first flash steam and a first cooled slurry. In an embodiment of the invention the pressure oxidation discharge slurry is obtained from metal containing ore or concentrate comprising 5 to 40% w/w sulphur as metal sulphides by pressure oxidizing the said ore or concentrate in a pressure oxidation autoclave.

When the pressure oxidation procedure further comprises a second flash vessel, the method may further comprise a step wherein: (b) a second flash steam directly obtained from a second flash vessel is contacted with a second recirculating condensate having a second low condensate temperature to condense at least part of the water vapour comprised in the said second flash steam on the second recirculating condensate and simultaneously to heat the said second recirculating condensate to obtain a second recirculating condensate having a second high condensate temperature and a second vent steam. When it is necessary to further reduce the pressure and/or the temperature of the first cooled slurry the second flash steam is preferably obtained by a step wherein the first cooled slurry obtained from the first flash vessel is allowed to flash in the second flash vessel to obtain the said second flash steam and a second cooled slurry.

In accordance with an embodiment of the method of the invention step (a) is performed in a first direct contact condenser. The temperature of the first vent steam is substantially same as the temperature of the first flash steam; similarly the temperature of second vent steam is substantially same as the temperature of the second flash steam. The step (a) can be performed at 1 to 60 bar and it is operated isobarically with the corresponding flash vessel.

In accordance with a further embodiment of the method of the invention step (b) is performed in a second direct contact condenser. The step (b) is performed may be performed at atmospheric pressure or at an elevated pressure, depending how many flashing steps are required for the pressure and temperature let down of the autoclave discharge slurry. In a preferred embodiment of the invention the said first dirty flash steam is contacted counter currently with the said first recirculating condensate. More preferably also the second flash steam is contacted counter currently with the said second recirculating condensate.

The pressure of the condenser and thus, also the pressure of the corresponding flash vessel, may be controlled as desired depending on the desired temperature of the recirculating condensate and the desired pressure and temperature drop of the slurry.

The method of the invention may further comprise a step wherein in step (b) the second flash steam is combined with the first vent steam before it is contacted with a second recirculating condensate in the second condenser. Typically the ratio of the second flash steam and the first vent steam entering the second condenser may by 10:1 to 50:1.

FIG. 1 shows a two stage pressure oxidation arrangement for the recovery of energy and water, comprising: an autoclave 1 arranged for pressure oxidation of metal containing ore or concentrate; a first flash vessel 2 connected to the autoclave 1 for receiving slurry obtained from the autoclave 1 and arranged for converting the heat of the slurry into a first flash steam and a first cooled slurry, a first condenser 3 connected to the first flash vessel 2 for receiving the flash steam produced in the said first flash vessel 2 and arranged for contacting the first flash steam with a first recirculating condensate having a first low condensate temperature and for condensing at least part of the water vapour comprised in the said flash steam and for raising temperature of the recirculating concentrate to obtain a first recirculating condensate having a first high condensate temperature and a first vent steam.

A first condensate line 301 is connected to the top portion of the first condenser 3 for providing the recirculating condensate having the first low condensate temperature to the first condenser 3 and further connected to the bottom portion of the same vessel 3 for recovering the first recirculating condensate having the first high condensate temperature and recirculating the said condensate. A first heat exchanger 31 is arranged to the first condensate line 302 for transferring the heat of the first recirculating condensate having the first high condensate temperature to a first heat transfer fluid 32. The heat exchanger is provided both for recovering energy from the recirculating condensate and for cooling the said condensate before it re-enters the condenser i.e. regenerating the first recirculating condensate having the first low condensate temperature. Herein and hereafter the combination of a flash vessel and a condenser and the further interrelated apparatus is referred to as a flash and condensing unit. The first condenser 3 may optionally be further connected to the autoclave 1 for receiving and condensing autoclave vent steam.

The arrangement further comprises a second flash and condensing unit i.e. a second flash vessel 4 connected to the first flash vessel 2 for receiving the first cooled slurry and converting the heat of the first cooled slurry into a second flash steam and a second cooled slurry; a second condenser 5 connected to the second flash vessel for receiving the second flash steam, and optionally further connected to the first condenser 3 for receiving the first vent steam, and arranged for contacting the second flash steam with a second recirculating condensate having a second low condensate temperature and for condensing at least part of the water vapour comprised in the said second flash steam and the optional first vent steam and for raising the temperature of the recirculating condensate to obtain a second recirculating condensate having a second high condensate temperature and a second vent steam. The second condenser 5 is preferably further connected to the first condenser 3 for receiving and condensing the first vent steam.

Referring to FIG. 1, the discharge slurry leaving the autoclave 1 is transferred via a first slurry pipeline 102 to the first flash vessel 2 where it as the pressure drops provides a first flash steam which comprises, in addition to water steam, up to 40% w/w of slurry, and, as a result of the temperature let down, further provides a first cooled slurry. Autoclaves used for high temperature leaching typically operate at a temperature of 140 to 270° C. and thus in accordance with the invention the temperature of the incoming autoclave discharge slurry may vary within this range. The temperature of the first flash steam is dependent on ore and the pressure of the first flash stage. However, the temperature and the pressure of the first flash steam may be controlled as desired by a first condenser vent 30 as will be discussed later. Thus the temperature of the first flash steam is typically between 150 to 220° C. The temperature of the first cooled flash slurry is lower than that of the autoclave discharge slurry, typically 150 to 200° C. The temperature of the first flash steam and the first cooled slurry is typically about the same as the slurry is boiling in the flash vessel.

From the first flash vessel 2 the first flash steam is transferred via a steam line 204 to the first condenser 3 where it is contacted with a first recirculating condensate provided by the condensate line 301. Optionally all or part of the autoclave vent steam may be additionally transferred via autoclave vent 10 and autoclave vent line 203 to the first condenser 3. Before entering the first condenser the autoclave vent steam may be mixed with the first flash steam or the steam may enter the first condenser independently. The autoclave vent steam may alternatively be discarded to the atmosphere via a steam pipeline 202. Prior to release to the atmosphere the steam may be cleaned in a gas scrubbing unit 8.

The first cooled flash slurry is transferred via a second slurry pipeline 103 to a second flash vessel 4 where it as the pressure drops produces a second flash steam and a second cooled slurry. The temperature of the second flash steam is dependent of the temperature of the first cooled slurry and the pressure drop of the second flash stage. However, the temperature and the pressure of the second flash steam may be controlled as desired by a second condenser 50 vent as will be discussed later. Thus the temperature of the second flash steam is typically 100 to 130° C. The temperature of the second cooled flash slurry is lower than that of the first cooled slurry, typically 100 to 130° C. The temperature of the second flash steam and the second cooled slurry is typically about the same as the slurry is boiling in the flash vessel. By controlling flash pressure in the second flash vessel the temperature of the obtained recirculating condensate can be controlled, and thus the arrangement may be adjusted depending on the nature of the desired recovered energy and its usage.

From the second flash vessel 4 the second flash steam is transferred via a steam line 205 to the second condenser 5 where it is contacted with a second recirculating condensate provided by the condensate line 304. Preferably all or part of the first vent steam is additionally transferred via first condenser vent 30 and first condenser vent line 207 to the second condenser 5. Before entering the second condenser it may be mixed with the second flash steam or the steam may enter the second condenser independently. The first vent steam may alternatively be discarded to the atmosphere via a steam pipeline 209. Prior to release to the atmosphere the steam may be cleaned in a gas scrubbing unit 8.

Figure 2:
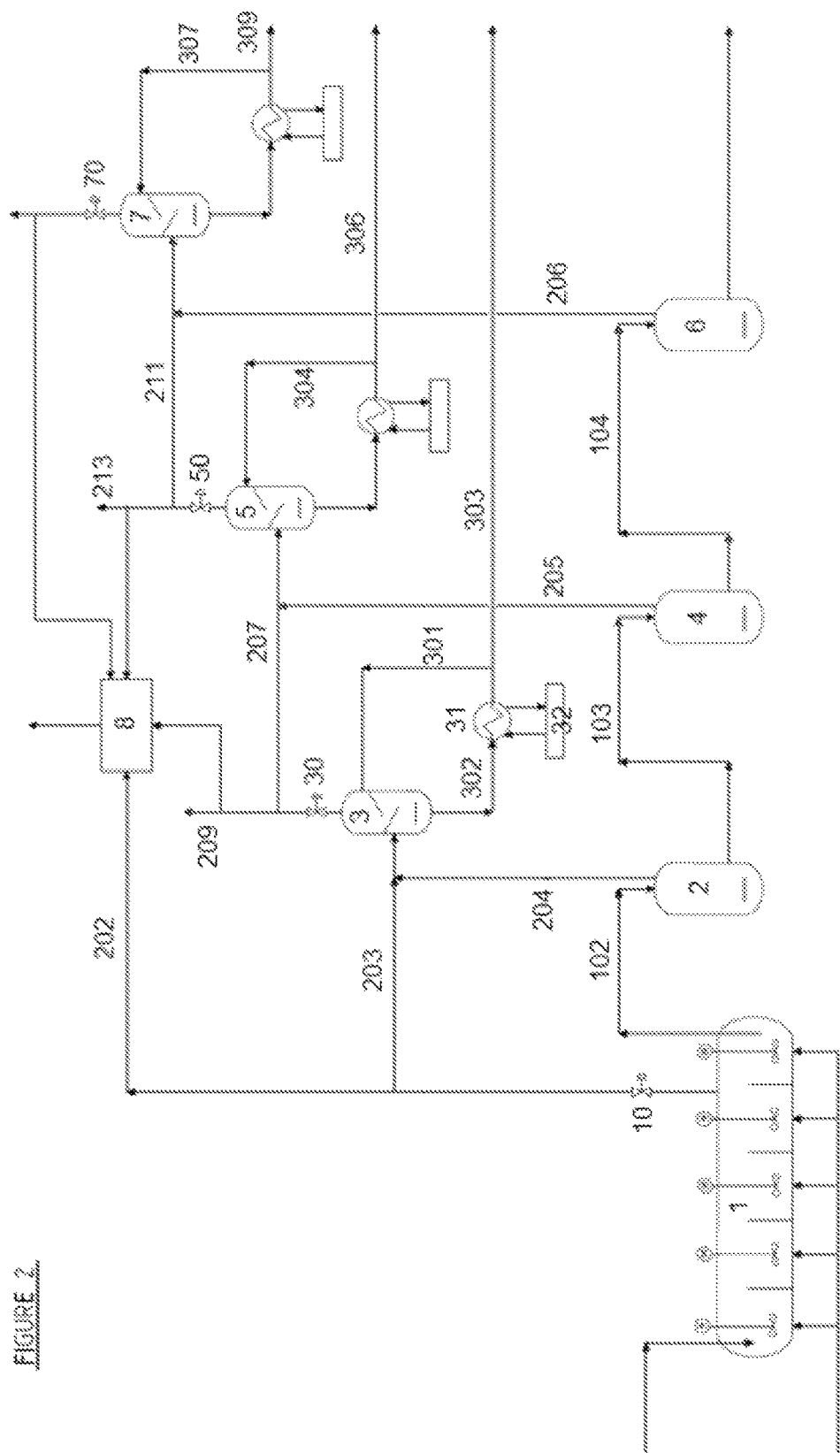
FIG. 2 shows a second arrangement illustrating a second embodiment of the invention.

As show in FIG. 2 as a further embodiment of the invention, the arrangement may further comprise a further flash and condensing unit. In FIG. 2, like components are designated by the same reference numerals as used in FIG. 1.

In embodiment presented in FIG. 2 the arrangement further comprises a third flash and condensing unit i.e. a third flash vessel 6 connected to the second flash vessel 4 for receiving the second cooled slurry and converting the heat of the second cooled slurry into a third flash steam and a third cooled slurry; a third condenser 7 connected to the third flash vessel 6 for receiving the third flash steam, and further connected to the second condenser 5 for receiving the second vent steam, and arranged for condensing at least part of the water vapour comprised in the said third flash steam and the second vent steam to obtain a third condensate and a third vent steam. The third condenser 7 is preferably further connected to the second condenser 5 for receiving and condensing the second vent steam.

Referring to FIG. 2, the second cooled flash slurry is transferred via a third slurry pipeline 104 to the third flash vessel 6 where it as the pressure drops produces the third flash steam and the third cooled slurry. The temperature of the third flash steam is dependent of the temperature of the second cooled slurry and the pressure drop of the third flash stage. Thus the temperature of the third flash steam is typically 100 to 130° C. The temperature of the third cooled flash slurry is lower than that of the second cooled slurry, typically 100 to 130° C.

From the third flash vessel 6 the third flash steam is transferred via a steam line 206 to the third condenser 7 where it is contacted with a third recirculating condensate provided by the condensate line 307. Preferably all or part of the second vent steam is additionally transferred via second condenser vent 50 and a second condenser vent line 211 to the third condenser 7. Before entering the third condenser it may be mixed with the third flash steam or the steam may enter the third condenser independently. The second vent steam may alternatively be discarded to the atmosphere via a steam pipeline 213. Prior to release to the atmosphere the steam may be cleaned in a gas scrubbing unit 8.

For optimal operation, each condenser ideally operates isobarically with the respective flash vessel. A condenser vent valve is operated to maintain and control the pressure in the flash vessel and the condenser and thus to control the temperature of the obtained recirculating condensate having a high condensate temperature. As shown in FIG. 1, a first condenser vent 30 of the first condenser 3 is arranged for controlling the pressure in the first flash vessel 2 and the first condenser 3. Similarly a second condenser vent 50 of the second condenser 5 is arranged for controlling the pressure of the second flash vessel 4 and the second condenser 5. If the second flash vessel 4 and the second condenser 5 are operated at atmospheric pressure the second condenser vent 50 is not required, Further, referring to FIG. 2, a third condenser vent 70 of the third condenser 7 may optionally be arranged for controlling the pressure of the third flash vessel 6 and the third condenser 7. Again, such vent is not required for the operation of the flash and condensing unit if the pressure of the said unit is at atmospheric pressure.

The condenser of the invention is preferably a direct contact condenser. The direct contact condenser operates in a true counter current fashion which allows the condensate temperature approach 1 or 2° C. of the flash steam temperature. Thus high grade energy condensate can be generated from flash steam having a temperature above 100° C. Flash steam that comprises acidic slurry and/or elemental sulphur may scale metal surfaces. However, the use of a direct contact condenser is preferred in accordance with the invention as it will continue to operate even in heavily scaled condition. The direct contact condenser also allows isobaric operation of the condenser with the corresponding flash vessel and the pressure control for both the condenser and the flash vessel may be provided by the condenser vent valve. Thus in accordance with the present invention a direct contact condenser may be used for recovery of energy and water from a pressure oxidation flash steam by a method of the invention.

The recirculating condensate in any condenser of the invention is an aqueous solution comprising condensed water and slurry resulting from the condensing flash steam. For initial contact with the flash steam, however, the recirculating condensate may consist only of cooled water or aqueous solution on which the flash steam condenses. As the recirculating condensate exits the condenser it may be recovered from the process by bleeding it from the recirculating concentrate stream. Referring to FIGS. 1 and 2, the recirculating condensate may be recovered though waterlines 303, 306 and 309. The recovered water may be reused with in the process or for example as filter wash water. Also recovery of solids is possible from the recovered water thus enhancing the total economy of the process. This is particularly important in gold processing as the solids will contain precious gold. Prior to re-entry of the recirculating condensate to the condenser it preferably cooled to a temperature below the temperature of the incoming flash steam. The temperature of the incoming recirculating condensate is typically 10 to 80° C. below the temperature of the flash steam. The desired temperature of the incoming recirculating condensate depends on the nature of the energy recovery system, the temperature of the flash steam and the desired temperature of the hot recirculating condensate.

Although a primary heat exchanger is shown both in FIG. 1 and FIG. 2, it is also possible to utilize the condensate as such. Transfer of the heat from the recirculating condensate to a further heat transfer fluid, for example to water, however allows broader possibilities for the utilization of the recovered energy and recirculation of the condensate to the condenser. High grade energy obtained by the heat transfer can be used in for example for generating steam in a boiler when the temperature of the hot water is above 180° C. and further high and medium grade energy may be used in district heating, water desalination, vacuum distillation and general process heating outside autoclave. Low grade energy can be used for example in vacuum desalination and water recovery. In accordance with the present invention recirculating condensate and/or recovered water obtained by a method of the invention may be used as an energy source.

In accordance with the present invention, the arrangement may comprise as many flash and condensing units as is found necessary for the pressure and temperature let down of the autoclave discharge slurry and/or the recovery of energy and water from the said slurry. The temperatures of the flash and condensing units may be tailored such that a particular energy grade can be produced, e.g. 180° C. for a boiler or 120° C. for vacuum desalination. The number of the units is depended on the operating temperature of the autoclave and the desired energy efficiency of the process, typically 1 to 5 stages. Further in accordance with the invention any further flash and condensing unit may or may not comprise a further condenser vent.

The condensation of the steam in the condenser is not complete. Approximately 5 to 10% w/w of the incoming steam is not condensed in the condenser and is discharged from the condenser as a vent steam at substantially the same temperature and pressure as the incoming steam. The vent steam is advantageously purified in the condenser from most or all of the comprised slurry and may be released to the atmosphere without further cleaning. Thus preferably no further direct cleaning of the vent steam is required.

It will be obvious to a person skilled in the art that, as the technology advances, the inventive concept can be implemented in various ways. The invention and its embodiments are not limited to the examples described above but may vary within the scope of the claims.

The invention claimed is:

1. A method of recovering energy and water from pressure oxidation flash steam, characterized in that the recovery of energy and cooling of a condensate are performed in a heat exchanger, and in that the method comprises a step wherein:
    (a) a first flash steam directly obtained from a first flash vessel is contacted with a first recirculating condensate having a first low condensate temperature
        to condense at least part of any water vapor comprised in the said first flash steam on the first recirculating condensate and
        simultaneously with the contacting to heat the said first recirculating condensate to obtain a first recirculating condensate having a first high condensate temperature and a first vent steam,
    wherein the first flash steam is obtained by flashing, in the first flash vessel, pressure oxidation discharge slurry from a pressure oxidation autoclave,
    wherein the first recirculating condensate having a first high condensate temperature is an aqueous solution comprising condensed water and slurry resulting from condensing the first flash steam,
    wherein the step (a) is performed in a first direct contact condenser.

2. The method as claimed in claim 1, wherein the first flash steam is obtained by a step wherein a pressure oxidation discharge slurry obtained directly from a pressure oxidation autoclave is allowed to flash in the first flash vessel to obtain the said first flash steam and a first cooled slurry.

3. The method as claimed in claim 2, wherein the pressure oxidation discharge slurry is obtained by pressure oxidation of metal containing ore or concentrate comprising 5 to 40% w/w sulfur as metal sulphides.

4. The method as claimed in claim 1, wherein the method further comprises a step wherein:
    (b) a second flash steam directly obtained from a second flash vessel is contacted with a second recirculating condensate having a second low condensate temperature to condense at least part of any water vapor comprised in the said second flash steam on the second recirculating condensate and simultaneously with the contacting to heat the said second recirculating condensate to obtain a second recirculating condensate having a second high condensate temperature and a second vent steam.

5. The method as claimed in claim 4, wherein the second flash steam is obtained by a step wherein a first cooled slurry obtained from a first flash vessel is allowed to flash in the second flash vessel to obtain the said second flash steam and a second cooled slurry.

6. The method as claimed in claim 4, wherein the method further comprises a step wherein the second flash steam is combined with the first vent steam before it is contacted with a second recirculating condensate having a second low condensate temperature in the second condenser.

7. The method as claimed in claim 4, wherein step (b) is performed in a second direct contact condenser.

8. The method as claimed in claim 4, wherein step (b) is performed at atmospheric pressure.

9. The method as claimed in claim 4, wherein the second flash steam is contacted counter currently with the second recirculating condensate having a second low condensate temperature.

10. The method as claimed in claim 1 characterized in that the first flash steam is contacted counter currently with the first recirculating condensate having a first low condensate temperature.

11. The method of claim 1, further comprising step (b) wherein the first recirculating condensate having a first high condensate temperature is a source of heat energy.

12. The method of claim 1, wherein the recovery of energy and cooling of a condensate are performed in a heat exchanger, and in that the method comprises a step wherein:
    (a) a first flash steam directly obtained from a first flash vessel is contacted with a first recirculating condensate having a first low condensate temperature, and simultaneously with the contacting to heat the said first recirculating condensate to obtain a first recirculating condensate having a first high condensate temperature and a first vent steam, wherein the step (a) is performed in a first direct contact condenser,
    the method further comprising recovering heat energy and the condensed water from the pressure oxidation flash steam by using the direct contact condenser.

* * * * *

UNITED STATES PATENT AND TRADEMARK OFFICE
CERTIFICATE OF CORRECTION

PATENT NO. : 10,323,295 B2  
APPLICATION NO. : 14/653232  
DATED : June 18, 2019  
INVENTOR(S) : O'Callaghan et al.

It is certified that error appears in the above-identified patent and that said Letters Patent is hereby corrected as shown below:

In the Specification

| Column | Lines | |
|---|---|---|
| 3 | 34 | "entering the second condenser may by 10:1 to 50:1" should be -- entering the second condenser may be 10:1 to 50:1 -- |
| 5 | 19 | "As show in FIG.2..." should be -- As shown in FIG.2..." -- |
| 5 | 24 | "In embodiment presented in FIG.2..." should be -- In the embodiment presented in FIG.2..." -- |

Signed and Sealed this  
Sixth Day of August, 2019

Andrei Iancu  
*Director of the United States Patent and Trademark Office*